(12) United States Patent
Krampotich et al.

(10) Patent No.: US 8,483,536 B2
(45) Date of Patent: Jul. 9, 2013

(54) FRONT-ACCESS LOCKING ARRANGEMENT FOR SLIDING DRAWER

(75) Inventors: Dennis Krampotich, Shakopee, MN (US); Ryan Kostecka, Burnsville, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 13/275,042

(22) Filed: Oct. 17, 2011

(65) Prior Publication Data

US 2012/0275754 A1 Nov. 1, 2012

Related U.S. Application Data

(63) Continuation of application No. 12/381,155, filed on Mar. 6, 2009, now Pat. No. 8,041,175.

(60) Provisional application No. 61/126,653, filed on May 5, 2008.

(51) Int. Cl.
*G02B 6/00* (2006.01)
*E05B 65/46* (2006.01)
*A47B 95/02* (2006.01)

(52) U.S. Cl.
USPC .............................. 385/135; 70/85; 312/332.1

(58) Field of Classification Search
USPC ...................................... 70/85–88; 312/332.1
See application file for complete search history.

(56) References Cited

U.S. PATENT DOCUMENTS

| | | | |
|---|---|---|---|
| 2,517,175 | A | 8/1950 | Bremer |
| 3,589,783 | A | 6/1971 | Studinski |
| 3,651,986 | A | 3/1972 | Karecki et al. |
| 3,782,800 | A | 1/1974 | Remington et al. |
| 5,141,266 | A | 8/1992 | Braun et al. |
| 5,723,850 | A | 3/1998 | Lambert |
| 5,802,892 | A | 9/1998 | Cohn et al. |
| 6,435,587 | B1 | 8/2002 | Flowerday et al. |
| 6,438,310 | B1 | 8/2002 | Lance et al. |
| 6,504,988 | B1 | 1/2003 | Trebesch et al. |
| 7,079,744 | B2 | 7/2006 | Douglas et al. |
| 7,171,099 | B2 | 1/2007 | Barnes et al. |
| 7,764,859 | B2 | 7/2010 | Krampotich et al. |
| 2002/0124779 | A1 | 9/2002 | Perkins |
| 2005/0025444 | A1 | 2/2005 | Barnes et al. |
| 2007/0031099 | A1 | 2/2007 | Herzog et al. |
| 2008/0085092 | A1 | 4/2008 | Barnes |
| 2008/0304803 | A1 | 12/2008 | Krampotich et al. |

OTHER PUBLICATIONS

U.S. Appl. No. 61/072,184, filed Mar. 28, 2008; Krampotich; 29 pages.
U.S. Appl. No. 61/126,672, filed May 5, 2008; Krampotich et al.; 33 pages.
U.S. Appl. No. 12/381,160, filed Mar. 6, 2009; Krampotich et al.

*Primary Examiner* — Jerry Rahll
(74) *Attorney, Agent, or Firm* — Merchant & Gould PC

(57) ABSTRACT

A cable management panel including a chassis, a drawer, and an open-drawer locking arrangement. The open-drawer locking arrangement preventing inadvertent closing movement of the drawer relative to the chassis. The open-drawer locking arrangement including an activation arm accessible from the front of the drawer and a locking piece located at the rear of the drawer. The activation arm moving in a linear direction to engage the locking piece, causing the locking piece to rotate from a locking position to a non-locking position.

17 Claims, 7 Drawing Sheets

FRONT-ACCESS LOCKING ARRANGEMENT FOR SLIDING DRAWER

CROSS-REFERENCE TO RELATED APPLICATIONS

This application is a continuation of U.S. patent application Ser. No. 12/381,155, filed Mar. 6, 2009, which application claims the benefit of U.S. Provisional Application Ser. No. 61/126,653, filed May 5, 2008; which application is incorporated herein by reference.

TECHNICAL FIELD

This disclosure relates generally to methods and devices for management of telecommunication cables. More particularly, this disclosure relates to a cable management panel having a drawer for managing fiber optic cables.

BACKGROUND

Cable management arrangements for cable termination, splice, and storage come in many forms. One cable management arrangement used in the telecommunications industry today includes sliding drawers installed on telecommunications equipment racks. The drawers organize and manage high-density cable terminations, cable splicing, and cable storage.

As can be understood, access to the interior of drawers is needed for purposes of cable and component installation, repair, and maintenance. Often times during such procedures, the drawers can inadvertently close or move rearward causing damage to unsecured cables and/or components. There is a continued need in the art for providing drawer arrangements that accommodate and ease the procedures associated with accessing the drawer interior during such installation, repair, and maintenance.

SUMMARY

One aspect of the present invention relates to a cable management panel having a chassis, a sliding drawer, and a front-access locking arrangement. The front-access locking arrangement includes a locking mechanism that locks the drawer in an open position to prevent inadvertent closing movement of the drawer relative to the chassis.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to various features of the present disclosure that are illustrated in the accompanying drawings. Wherever possible, the same reference numbers will be used throughout the drawings to refer to the same or like parts.

Figure 1:
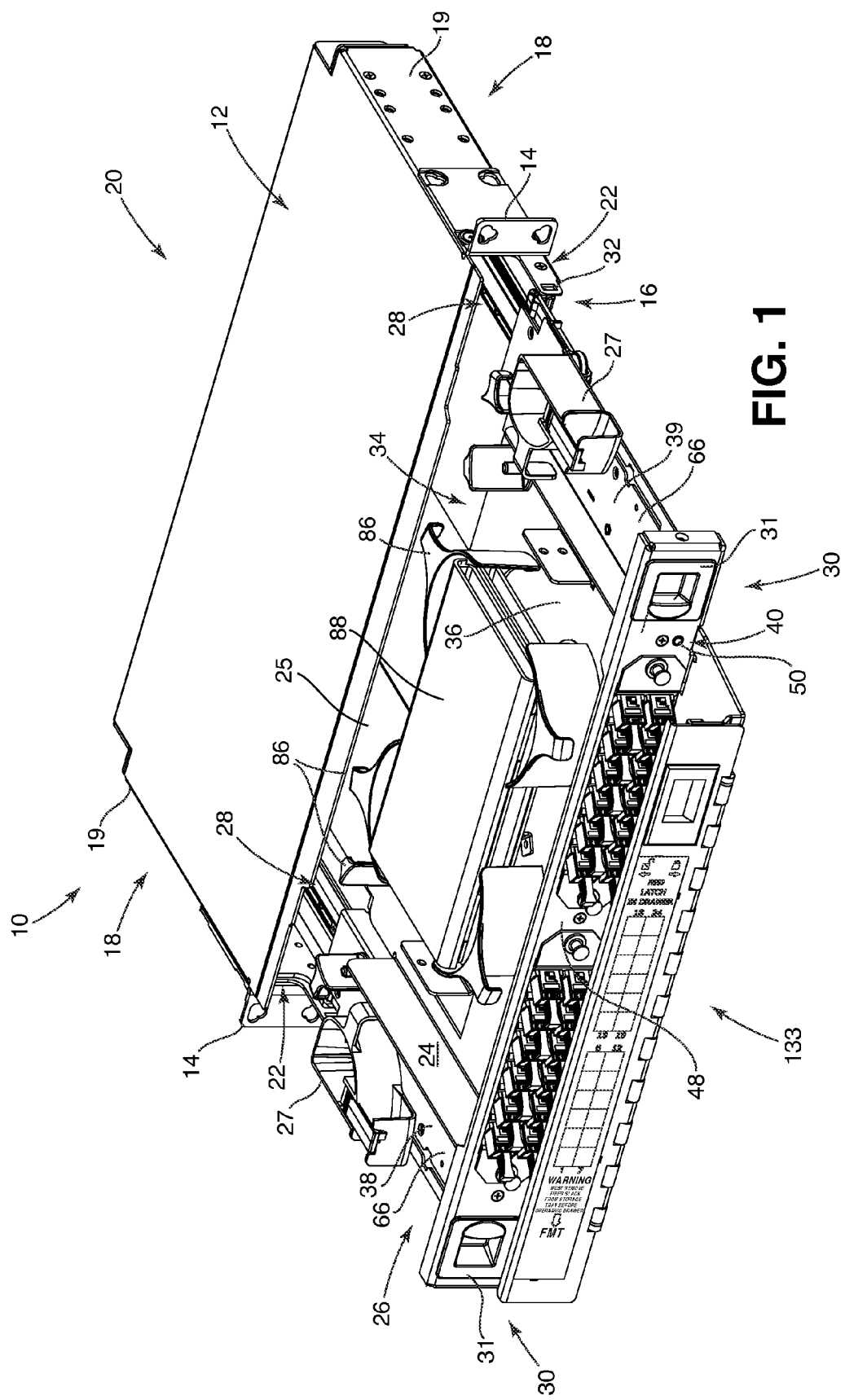
FIG. 1 is a front perspective view of a cable management panel having a locking arrangement according to the principles of the present disclosure, the cable management panel shown with a drawer of the panel in an opened, locked position.

Referring to FIG. 1, a cable management module or panel 10 according to the present invention is illustrated. The cable management panel 10 includes a frame or chassis 12 having mounting brackets 14. Further details of an example mounting bracket arrangement that can be used in accordance with the principles disclosed is described in U.S. Pat. No. 7,171,099, the disclosure of which is hereby incorporated by reference. The mounting brackets 14 are used to mount the panel 10 to a telecommunication structure, such as a telecommunications rack, cabinet or other enclosure or framework.

Referring still to FIG. 1, the chassis 12 of the cable management panel 10 has a front 16, opposite sides 18, and a rear 20. The sides 18 include sidewalls 19 each having cable access openings 22 for cables entering or exiting the chassis 12. The chassis 12 further includes a top wall 23 and an opposite bottom wall 25.

The cable management panel 10 also includes a drawer 26 having an interior region 24. The drawer 26 slides relative to the chassis 12 by way of a drawer slide assembly 28 located at each side 18 of the chassis 12. Further details of slide assemblies that can be used in the present cable management panel are described in U.S. Pat. No. 7,171,099 and U.S. Publication No. 2007/0107349; which disclosures are incorporated herein by reference. In a closed position, the contents of the interior region 24 of the drawer 26 are enclosed and protected. In an open position, the interior region 24 can be accessed for cable or component installation, maintenance, or repair.

The drawer 26 of the cable management panel 10 has a front 33, a rear 34, a base 36, and sides 38, 39. In the illustrated embodiment, the rear 34 of the drawer 26 is open. Likewise, the sides 38, 39 of the drawer 26 are open. The open rear and open sides allow for cable entry into and cable exit from the interior region 24 of the drawer 26. Radius limiters 27 are provided at the open sides 38, 39 of the drawer for managing the exiting and entering cables at the sides during sliding movement of the drawer 26. The radius limiters 27 also protect the cables from damage by limiting cable bending beyond a minimum bend radius. Further details of example radius limiters and radius limiter assemblies that can be used in the present cable management panel are described in U.S. Pat. Nos. 6,438,310; 6,504,988; and 7,079,744; the disclosures of which are each incorporated herein by reference.

The cable management panel 10 can contain a variety of cable management elements. The cable management elements can be mounted to the base 36 of the drawer 26, or mounted on a tray or insert that drops into the interior region 24 of the drawer. Further details of an example drop-in tray that can be used in the present cable management panel 10 are described in U.S. Publication No. 2007/0031099, U.S. Provisional Application No. 61/072,184, filed Mar. 28, 2008, U.S. Provisional Application No. 61/126,672, filed May 5, 2008, and U.S. application Ser. No. 12/381,160, filed Mar. 6, 2009; which disclosures are incorporated herein by reference.

The variety of cable management elements that the cable management panel 10 may contain include cable retainers (e.g., 86), splice trays (e.g., 88), and adapter or connector holders to which fiber optic cables are terminated. Examples of other cable management elements include other constructions, assemblies, and devices for storing cables or connecting the cables to other cables; and/or other fiber optic devices, such as attenuators, couplers, switches, wave division multiplexers (WDMs), and splitters/combiners. The U.S. patents and applications previously incorporated herein by reference describe examples of cable management elements and arrangements that can be provided within the interior region 24 of the drawer 26. As can be understood, the drawer 26 can be customized to include numerous forms of cable management elements to accommodate the particular needs of the user.

Figure 2:
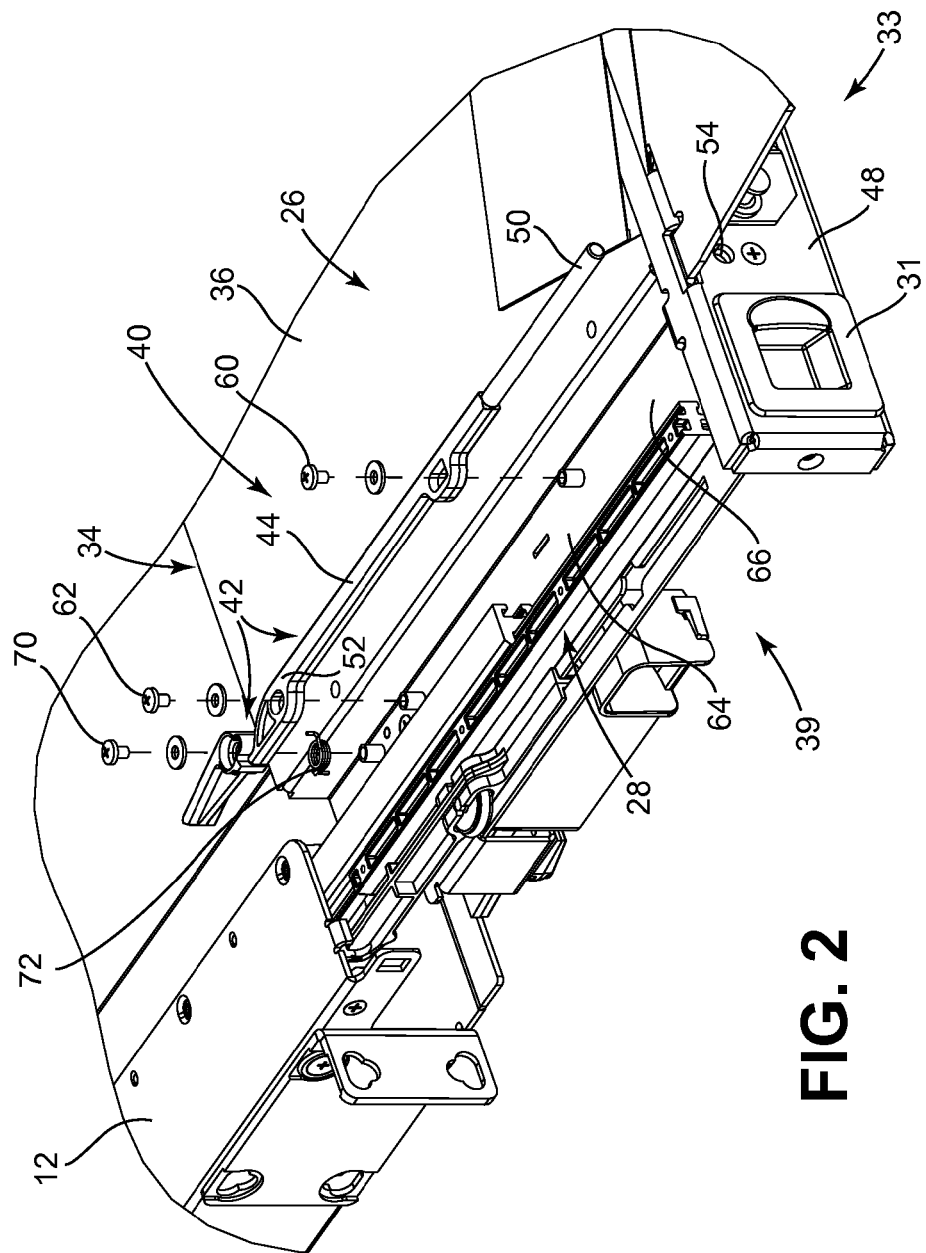
FIG. 2 is a partially exploded bottom view of a portion of the cable management panel of FIG. 1.

Referring still to FIG. 1, the present cable management panel 10 includes a first drawer locking arrangement 30 and a second drawer locking arrangement 40 (see also FIG. 2). The first drawer locking arrangement 30 locks the drawer in the closed position; the second drawer locking arrangement 40 locks the drawer in the open position.

The second open-drawer locking arrangement 40 is designed to prevent inadvertent closing movement of the drawer 26 relative to the chassis 12. What is meant by closing movement is movement of the drawer in a rearward direction from the open position toward the closed position. It is noted that the drawer 26 can move beyond the open position to an extended open position in a forward direction. The user may move the drawer rearward from the extended open position to the open position; this rearward movement is not the closing movement that the second open-drawer locking arrangement prevents. Rather, the closing movement is movement of the drawer in a rearward direction from the open position toward the closed position, which can cause damage to cables and components when such movement inadvertently occurs during installation, repairs or maintenance.

For example, during installation, repair or maintenance procedures, the user or technician routes cables into and out from the drawer, and/or internally routes cables to and from components contained within the drawer. Often times, the cables or components are pulled or pushed, forcing the drawer in a rearward direction. Closing movement of the drawer in the rearward direction can cause damage to cables and/or components not yet completely routed or secured. The presently disclosed open-drawer locking arrangement 40 prevents the drawer 26 from closing and eliminates the occurrence of cable damage and/or component damage due to such inadvertent closing movement.

In the present cable management panel 10, each of the first drawer locking arrangement 30 and the second drawer locking arrangement 40 is accessed from the front 33 of the drawer 26. For example, the first closed-drawer locking arrangement 30 includes two front latches 31 located in a front panel 48 that defines the front 33 of the drawer 26. Each front latch 31 is located in the front panel 48 adjacent to one of the sides 38, 39 of the drawer 26. In the closed position, the latches 31 engages a side hole 32 located at the side 18 of the chassis 12 to secure the drawer 26 in the closed position. To unlock the drawer from the locked closed position, the latches 31 are accessed from the front 33 and moved toward one another to disengage from the side holes 32 of the chassis 12. With the latches 31 disengaged from the side holes 32 of the chassis, the drawer 26 is free to slide open.

Referring now to FIG. 2, the second open-drawer locking arrangement 40 includes a linkage 42 located beneath of the drawer 26 on one of the sides 38, 39 of the drawer. As will be described in greater detail hereinafter, the linkage is accessible from the front 33 of the drawer 26. To unlock the drawer from the locked open position, the linkage 42 (i.e., 50, see also FIG. 1) is accessed from the front panel 48 of the drawer. While the illustrated embodiment depicts the drawer having only a single open-drawer locking arrangement 40, an open-drawer locking arrangement can be provided at each of the sides of the drawer.

Figure 3:
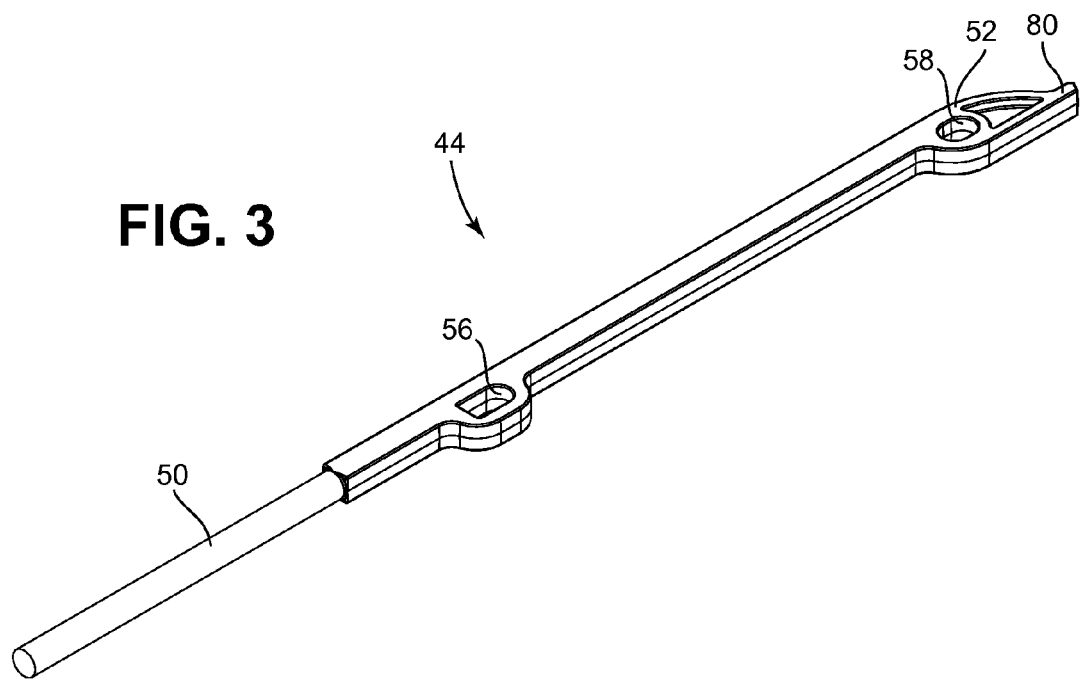
FIG. 3 is a perspective view of an activation arm of the locking arrangement of FIGS. 1 and 2, shown in isolation.
Figure 4:
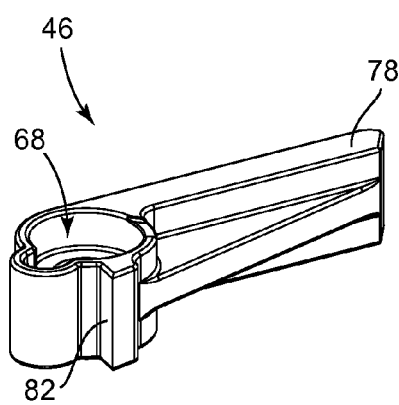
FIG. 4 is a perspective view of a locking piece of the locking arrangement of FIGS. 1 and 2, shown in isolation.

Referring to FIGS. 2-4, the linkage 42 of the second open-drawer locking arrangement 40 generally includes a push arm or activation arm 44 and a locking piece 46. The activation arm 44 includes a first end 50 and a second end 52. The first end 50 is accessible from the front 33 of the drawer 26. In particular, the first end 50 extends through an aperture 54 (FIG. 2) formed in the front panel 48 of the drawer 26. The second end 52 of the activation arm 44 is located to engage the locking piece 46. The locking piece 46 is located at the rear 34 of the drawer 26. The activation arm 44 accordingly has a length that extends from the front 33 of the drawer 26 to the rear 34 of the drawer.

Referring to FIGS. 2 and 3, the activation arm 44 has two apertures 56, 58 (FIG. 3) sized to receive fasteners 60, 62 (FIG. 2) that secure the activation arm 44 to a bottom or undersurface 64 of the drawer 26. The undersurface 64 in the illustrated panel 10 is defined by a horizontal side plate 66 (see also FIG. 1), which in turn defines the open side (e.g., both 38, 39) of the drawer 26.

Referring to FIG. 3, the apertures 56, 58 of the activation arm 44 each have an elongated slot shape. The elongated slot shape of the apertures permits the activation arm 44 to travel in a linear forward-rearward direction (as represented by arrow A in FIGS. 5 and 6), yet still secures the activation arm 44 in relation to the drawer 26. The locking piece 46 also defines an aperture 68 (FIG. 4) sized to receive a fastener 70 (FIG. 2) that separately secures the locking piece 46 to the undersurface 64 of the drawer 26. The aperture 68 of the locking piece 46 is shaped and sized to permit the locking piece 46 to rotate (as represented by arrow B in FIG. 6), yet still secures the locking piece 46 in relation to the drawer 26.

In use, when the drawer 26 is in the closed position, the latches 31 of the first drawer locking arrangement 30 automatically engage the side holes 32 of the chassis 12. This engagement locks the drawer 26 in the closed position. To open the drawer, the latches are disengaged from the side holes 32 and the drawer is slid to the open position.

The activation arm 44 and the locking piece 46 of the second locking arrangement 40 travel with the drawer 26 during sliding opening movement. Upon reaching the open position, the locking piece 46 automatically locks the drawer 26 in the open position. What is meant by "automatically" is that the locking piece 46 moves from a non-locking position to a locking position (see e.g., FIG. 6) without a technician having to manually move or manipulate the second open-drawer locking arrangement 40.

Figure 5:
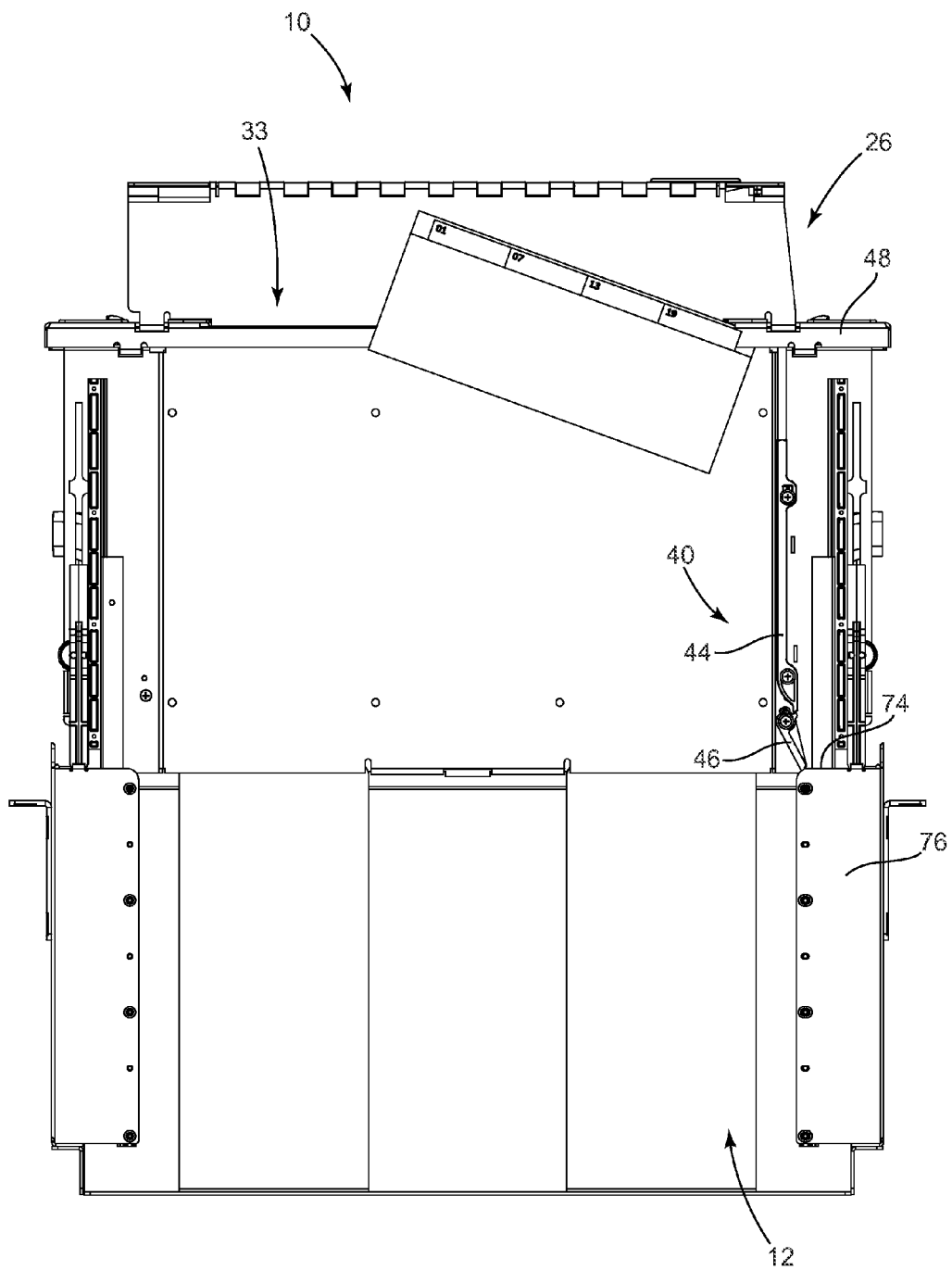
FIG. 5 is a bottom plan view of the cable management panel of FIG. 1, shown with the drawer in an opened locked position.
Figure 6:
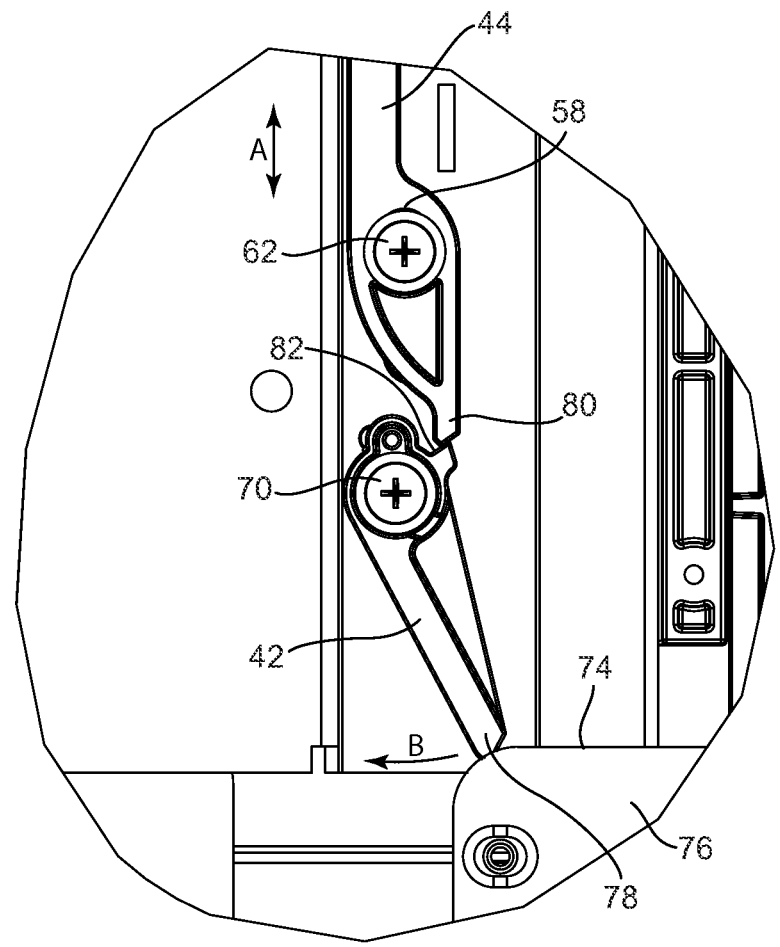
FIG. 6 is an enlarged view of a portion of the cable management panel of FIG. 5, illustrating the locking arrangement in a locked position.

In particular, the second open-drawer locking arrangement 40 includes a spring 72 (FIG. 2) that biases the locking piece 46 toward the locking position shown in FIG. 6. Referring to FIGS. 5 and 6, in the locking position, a distal end 78 of the locking piece 46 engages a transverse edge 74 of a bottom plate 76 of the chassis 12. With the drawer locked in this open position, the user can access the interior region 24 of the drawer 26 without concern of inadvertent closing movement that can cause damage to cables and components.

The present open-drawer locking arrangement 40 is arranged in relation to the drawer 26 and the chassis 12 such that a rear drawer wall is not required. In some applications, having a drawer with an open rear (e.g., 34, FIG. 1) is desirable, for example, to permit cables to enter and exit the interior drawer region from the rear of the chassis 12. The open-drawer locking arrangement 40 locks the drawer in the open position without requiring a rear drawer wall.

Figure 7:
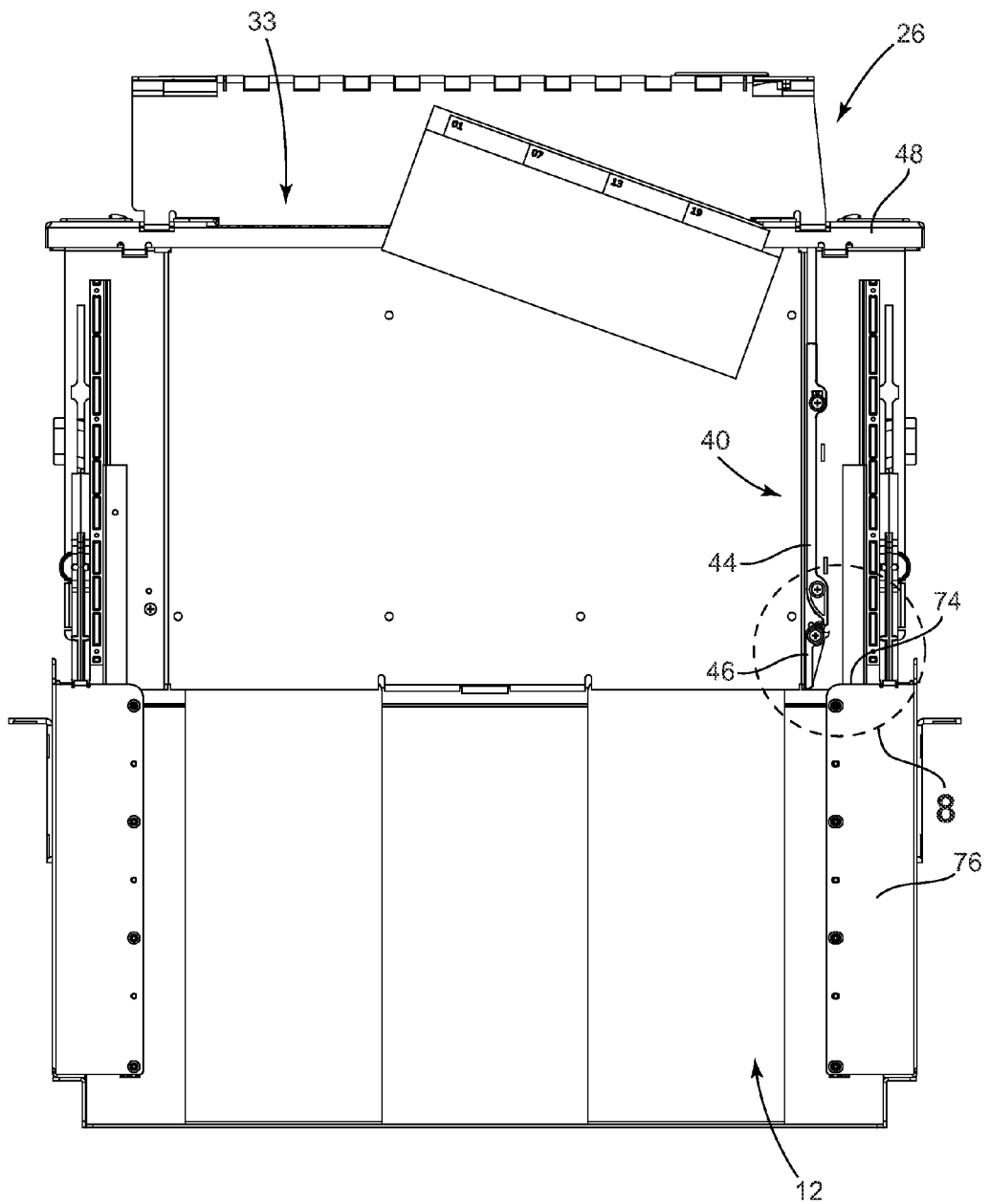
FIG. 7 is a bottom plan view of the cable management panel of FIG. 5, shown with the drawer in an opened unlocked position.

Referring still to FIGS. 5 and 6, to unlock and close the drawer 26, the user activates the arm 44; i.e., pushes on the first end 50 of the activation arm 44 extending through the front panel 48 of the drawer 26 (see FIG. 1). Pushing the first end 50 causes the activation arm 44 to travel in a linear direction A toward the locking piece 46 (i.e., the arm 44 slides or moves relative to fasteners 60, 62 by way of the slot-shaped apertures 56, 58). As the activation arm 44 linearly travels or moves, a nose or projection 80 of the arm 44 seats within a shoulder or notch 82 formed in the locking piece 46. Further linear movement of the arm causes the locking piece 46 to rotate about the fastener 70 (see arrow B, FIG. 6) such that the distal end 78 of the locking piece 46 disengages from the transverse edge 74 of the chassis 12 (see FIGS. 7 and 8).

Figure 8:
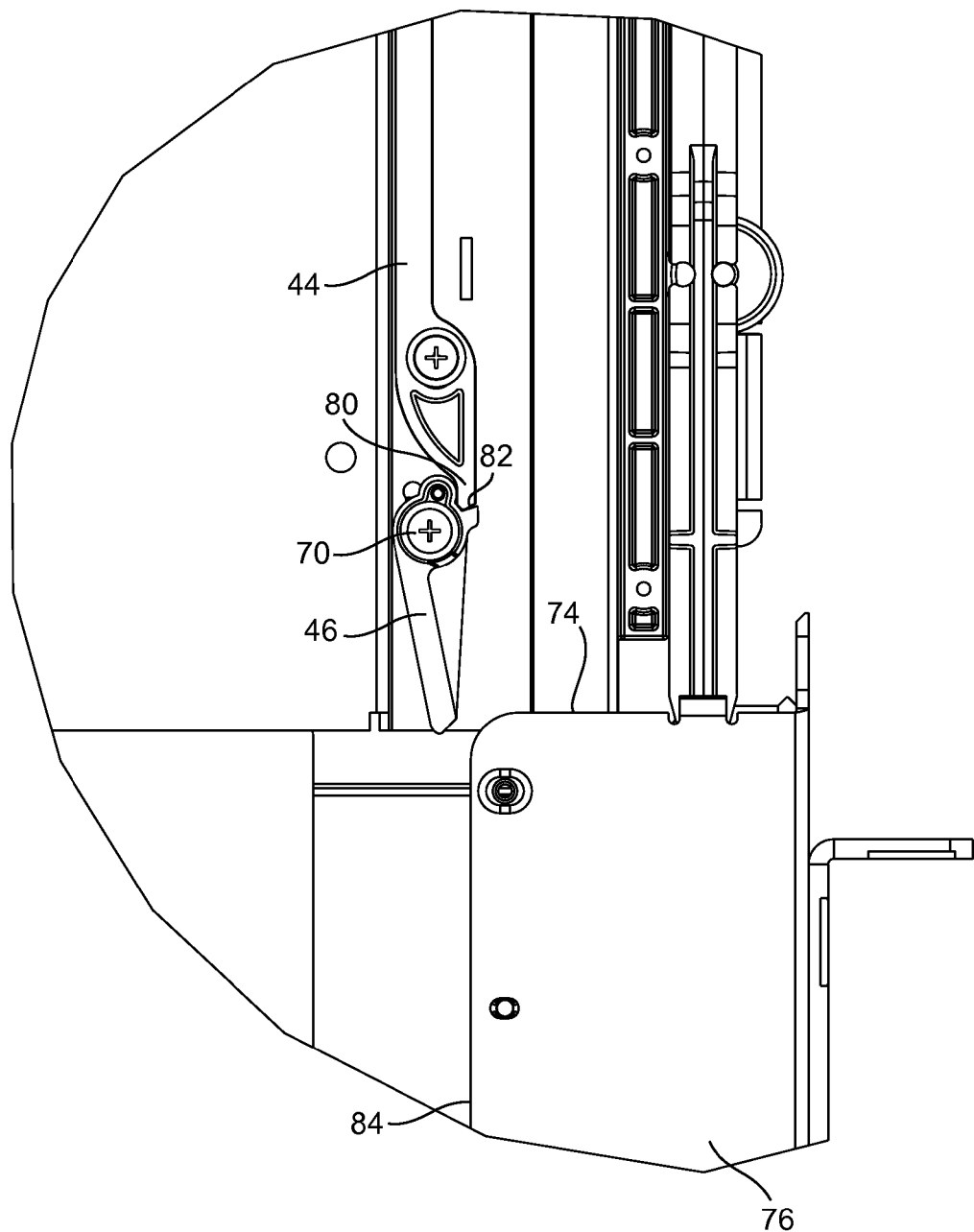
FIG. 8 is an enlarged view of a portion of the cable management panel of FIG. 7, illustrating the locking arrangement in an unlocked position.

In particular, the projection 80 of the arm 44 seats within the notch 82 of the locking piece 46 causing the locking piece to rotate from the locking position (FIG. 6) to the non-locking position (FIG. 8). In this non-locking position, the drawer 26 is unlocked and free to close. The locking piece 46 generally slides along a longitudinal edge 84 of the bottom plate 76 of the chassis 12 as the drawer 26 closes. As can be understood, in this position, the spring 72 is biased such that when the drawer is again opened, the locking piece 46 automatically rotates into engagement with the transverse edge 74 of the chassis 12 to lock the drawer 26 in the open position. The biasing action of the spring 72 and the rotation of the locking piece 46 cause the activation arm 44 to slide or move relative to fasteners 60, 62, by way of the slot-shaped apertures 56, 58, toward the front panel 48. The first end 50 of the activation arm is thereby in position at the front panel 48 for activation or access at the front 33 of the drawer 26.

The above specification provides a complete description of the invention. Since many embodiments of the invention can be made without departing from the spirit and scope of the invention, certain aspects of the invention reside in the claims hereinafter appended.

What is claimed is:

1. A cable management panel, comprising:
   a) a chassis;
   b) a drawer mounted to the chassis, the drawer being configured to slide between an open position and a closed position relative to the chassis, the drawer having a front, a rear, and opposite sides; and
   c) a first locking arrangement that locks the drawer in the closed position and a second locking arrangement that locks the drawer in the open position, the second locking arrangement including a locking piece secured to a bottom of the drawer, wherein to unlock the drawer from the closed position and the open position, each of the respective first and second locking arrangements is accessed from the front of the drawer.

2. The panel of claim 1, wherein the second locking arrangement includes a linkage having an activation arm and the locking piece, a first end of the activation arm being accessible from the front of the drawer.

3. The panel of claim 2, wherein the first end of the activation arm extends through a front panel of the drawer.

4. The panel of claim 3, wherein the locking piece is located at the rear of the drawer, the activation arm extending from the front of the drawer to the locking piece.

5. The panel of claim 2, wherein the activation arm moves in a linear direction when activated, the linear motion of the arm causing the locking piece to rotate from a locking position to a non-locking position.

6. The panel of claim 5, wherein the locking piece is biased toward the locking position by a spring.

7. The panel of claim 2, wherein the locking piece travels with the drawer during sliding movement, the locking piece engaging the chassis to lock the drawer in the open position.

8. The panel of claim 1, wherein the second locking arrangement automatically locks the drawer in the open position.

9. A cable management panel, comprising:
   a) a chassis;
   b) a drawer mounted to the chassis, the drawer being configured to slide between an open position and a closed position relative to the chassis, the drawer having a front, a rear, and opposite sides; and
   c) a locking arrangement that locks the drawer in the open position, the locking arrangement including an activation arm and a locking piece, the activation arm including a first end accessible from the front of the drawer and a second end positioned to engage the locking piece, the locking piece being secured to a bottom of the drawer and being located at the rear of the drawer.

10. The panel of claim 9, wherein the locking arrangement automatically locks the drawer in the open position.

11. The panel of claim 9, wherein a first end of the activation arm extends through a front panel of the drawer.

12. The panel of claim 9, wherein the activation arm moves in a linear direction to engage the locking piece so that the drawer is free to close.

13. The panel of claim 12, wherein upon engagement with the activation arm, the locking piece rotates from a locking position to a non-locking position.

14. The panel of claim 13, wherein locking piece is biased toward the locking position by a spring.

15. The panel of claim 9, wherein the locking piece travels with the drawer during sliding movement, the locking piece engaging the chassis to lock the drawer in the open position.

16. The panel of claim 9, wherein the actuation arm has a projection that seats within a shoulder formed in the locking piece when the drawer is unlocked in the open position.

17. The panel of claim 9, further including another front-accessible locking arrangement that locks the drawer in the closed position.

* * * * *